(12) United States Patent
Yabuki et al.

(10) Patent No.: US 7,503,966 B2
(45) Date of Patent: Mar. 17, 2009

(54) BLACK INK COMPOSITION AND INK JET RECORDING METHOD

(75) Inventors: Yoshiharu Yabuki, Minami-Ashigara (JP); Naotaka Wachi, Fujinomiya (JP); Kaoru Tojo, Fujinomiya (JP); Naoyuki Hanaki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 337 days.

(21) Appl. No.: 10/581,944

(22) PCT Filed: Jun. 7, 2005

(86) PCT No.: PCT/JP2005/010748

§ 371 (c)(1), (2), (4) Date: Jun. 6, 2006

(87) PCT Pub. No.: WO2005/121261

PCT Pub. Date: Dec. 22, 2005

(65) Prior Publication Data

US 2007/0139499 A1    Jun. 21, 2007

(30) Foreign Application Priority Data

Jun. 7, 2004   (JP) .............................. 2004-168046

(51) Int. Cl.
*C09D 11/00* (2006.01)
*C09D 11/02* (2006.01)
*B41J 2/01* (2006.01)

(52) U.S. Cl. .............. 106/31.52; 106/31.46; 106/31.48; 106/31.5; 347/100

(58) Field of Classification Search .............. 106/31.27, 106/31.52, 31.46, 31.48, 31.5; 347/100
See application file for complete search history.

(56) References Cited

U.S. PATENT DOCUMENTS

| | | | | |
|---|---|---|---|---|
| 6,835,240 B2 * | 12/2004 | Nishita et al. | ............ | 106/31.48 |
| 6,939,399 B2 * | 9/2005 | Yabuki | .................... | 106/31.27 |
| 7,029,523 B2 * | 4/2006 | Taguchi et al. | ........... | 106/31.46 |
| 7,037,365 B2 * | 5/2006 | Taguchi et al. | ........... | 106/31.46 |
| 7,048,790 B2 * | 5/2006 | Taguchi et al. | ........... | 106/31.46 |
| 7,208,035 B2 * | 4/2007 | Ogawa et al. | ............ | 106/31.58 |
| 7,211,133 B2 * | 5/2007 | Taguchi | .................... | 106/31.48 |
| 7,220,302 B2 * | 5/2007 | Taguchi | .................... | 106/31.46 |
| 7,267,715 B2 * | 9/2007 | Taguchi et al. | ........... | 106/31.48 |
| 7,273,519 B2 * | 9/2007 | Taguchi et al. | ........... | 106/31.46 |
| 7,303,272 B2 * | 12/2007 | Taguchi et al. | .............. | 347/100 |
| 2004/0154496 A1 * | 8/2004 | Taguchi | .................... | 106/31.48 |
| 2005/0243151 A1 * | 11/2005 | Chino et al. | ................. | 347/100 |
| 2007/0101899 A1 * | 5/2007 | Taguchi et al. | ........... | 106/31.27 |
| 2007/0266890 A1 * | 11/2007 | Taguchi et al. | ........... | 106/31.47 |
| 2008/0043078 A1 * | 2/2008 | Wachi | ......................... | 347/100 |
| 2008/0043079 A1 * | 2/2008 | Ikeda et al. | .................. | 347/100 |

FOREIGN PATENT DOCUMENTS

| | | |
|---|---|---|
| EP | 1 420 051 A1 | 5/2004 |
| JP | 5-201147 A | 8/1993 |
| JP | 7-132680 A | 5/1995 |
| JP | 9-255906 A | 9/1997 |
| JP | 3178200 B2 | 4/2001 |
| JP | 2002-167529 A | 6/2002 |
| JP | 2002-249683 A | 9/2002 |
| JP | 2002-309133 A | 10/2002 |
| JP | 2002-332426 A | 11/2002 |
| JP | 2004-149558 A | 5/2004 |
| JP | 2004-182978 A | 7/2004 |
| JP | 2005-36164 A | 2/2005 |
| WO | WO 2004/029166 | * 4/2004 |
| WO | WO 2005/040292 | * 5/2005 |
| WO | WO 2005/042652 | * 5/2005 |

OTHER PUBLICATIONS

Database WPI Week 198404 Derwent Publications Ltd., London, GB; AN 1984-021204 XP002419708 & JP 58 213069 A (RICOH KK) Dec. 10, 1983 *abstract*.
Database WPI Week 200436 Derwent Publications Ltd., London, GB; AN 2004-382501 XP002419709 & JP 2004 137332 A (Fuji Photo Film Co Ltd) May 13, 2004 *abstract*.
Database WPI Week 198403 Derwent Publications Ltd., London, GB; AN 1984-014986 XP002419710 & JP 58 208355 A (RICOH KK) Dec. 5, 1983 *abstract*.
International Search Report dated Sep. 13, 2005.

\* cited by examiner

*Primary Examiner*—Helene Klemanski
(74) *Attorney, Agent, or Firm*—Buchanan Ingersoll & Rooney PC

(57) ABSTRACT

A black ink composition comprises a water soluble dye containing a single compound showing an absorption maximum at 440 to 540 nm with a half-value width of 90 nm to 200 nm for a visible region absorption spectrum in water.

9 Claims, No Drawings

BLACK INK COMPOSITION AND INK JET RECORDING METHOD

DESCRIPTION

1. Technical Field

The present invention concerns a black ink composition (preferably, an image forming black ink composition (preferably, an ink jet ink composition)) containing an azo-dye having specified structure and characteristic, as well as an ink jet recording method of using the black ink composition.

2. Background Art

Since an ink jet recording method is inexpensive in the material cost, can conduct high speed recording, generates less noises during recording and, further, can conduct color recording easily, the method has been rapidly popularized and, further, has been now under development.

The ink jet recording method includes a continuous system of flying liquid droplets continuously and an on-demand system of flying liquid droplets in accordance with image information signals, and the discharge system includes a system of applying a pressure by a piezo-element thereby discharging liquid droplets, a system of generating bubbles in an ink by heat thereby discharging liquid droplets, a system of using supersonic waves, or a system of attract and discharging liquid droplets by electrostatic force.

Further, for the ink jet recording ink, an aqueous ink, an oily ink or a solid (hot-melt type) ink is used.

The colorant used for the ink jet recording ink described above is required that it has good solubility or dispersibility to a solvent, is excellent in color forming property and capable of conducting high density recording, has good hue, fastness to light, heat and active gases in the circumstance (oxidative gas such as NOx and ozone, as well as SOx), excellent fastness to water or chemicals, good fixing property to image receiving materials with less blur, excellent storability as ink, no toxicity, and high purity and, further, it is available at a reduced cost. However, it is extremely difficult to obtain a colorant capable of satisfying the requirements described above at high level. Particularly, it has been strongly demanded for a colorant for black ink use that has favorable black tone, can conduct printing at high concentration and is fast to light, humidity and heat.

Heretofore, while disazo a dye or trisazo dye has been used for the black dye, since absorption to blue to green light is insufficient merely by the use of the dyes described above thereby often failing to obtain a good black tone, a color compensation dye for absorbing such blue to green light is generally used together. As the compensation dye, those dyes described, for example, in JP-A No. 9-255906 and Japanese Patent No. 3178200 are proposed and improvement has been attempted for black tone controllability, color forming property, fastness, ink store stability, water proofness and clogging of nozzles.

However, the color compensation dyes proposed so far involve a problem of lacking in the black tone controllability such that a great amount of addition is required because the absorption wavelength is excessively short or further or other color compensation dye is further required.

Further, while dyes capable of absorbing blue to green lights have generally been known, most of them undergo remarkable change of hue when exposed to light, heat and active gases in the circumstance because of poor fastness, or cause a phenomenon such as yellow blurring at the profile portion under high humidity condition because of insufficient fixing property and, further improvement is necessary.

In view of the drawbacks described above, JP-A No. 2002-332426 describes a black ink composition in which a triazine dye having an absorption maximum in a visible region absorption spectrum at 435 nm in water is blended as a color compensation dye with a black dye.

However, general black dyes have maximum absorption at 570 to 620 nm, and it is apparent that no preferred black tone can be obtained even when the color compensation dye is used in view of the complementary color relation which is important for the control of the black tone ("Color Science Handbook (second edition)" from Tokyo University Publication Society, 1998, p560-562.).

Disclosure of the Invention

The present invention intends to solve the foregoing problems and attain the following objects.

That is, the present invention intends to provide a color compensation dye enabling printing with excellent black tone and at high density without requiring great amount of addition or other color compensation dye and excellent in color forming property, fixing property and fastness. Further, the invention provides an aqueous ink composition for printing ink composition use or hand writing use by using such a color compensation dye.

Further, the invention intends to provide an ink composition for use in ink jet recording having a favorable tone for black, capable of printing at high density, and capable of forming images at high fastness to light and ozone, and having such sufficient humidity resistance as not causing blur even when it is stored under high humidity condition, as well as an ink jet recording method of using such an ink composition for use in ink jet recording.

The present inventors have made detailed studies for various types of dye compounds intended for color compensation dye having favorable black tone controllability, favorable color forming property, high fastness to light and ozone and also excellent in humidity resistance and have found that the subject can be solved in accordance with a dye having the specified structure and absorption characteristic to be described below.

(1) A black ink composition comprising a water soluble dye containing a single compound showing an absorption maximum at 440 to 540 nm with a half-value width of 90 nm to 200 nm for a visible region absorption spectrum in water.

(2) A black ink composition as described in (1) above wherein the single compound is used as the only one color compensation dye.

(3) A black ink composition as described in (1) or (2) above, wherein the single compound has from 2 to 6 azo groups in one molecule and does not have a phenolic hydroxyl group.

(4) A black ink composition as described in any one of (1) to (3) above, wherein the water soluble dye is contained by 0.1 to 4 mass % in the black ink composition.

(5) A black ink composition as described in any one of (1) to (4) above, further comprising a water soluble black dye having from 2 to 4 azo groups conjugated to each other in one molecule.

(6) A black, ink composition as described in (5) above, wherein the water soluble black dye has a hydroxyl group at a conjugation position of at least one of the azo groups.

(7) A black ink composition as described in (5) or (6) above, wherein the water soluble black dye has one or less heterocyclic ring in a color forming group.

(8) A black ink composition as described in any one of (5) to (7) above wherein the water soluble black dye has an aggregate property.

(9) An ink for use in ink jet using the composition as described in any one of (1) to (8) above.

(10) An ink jet recording method comprising forming an image on an image receiving material by using an ink containing the black ink composition as described in any one of (1) to (8) above, wherein the image receiving material comprises: a support; and an ink receiving layer containing white inorganic pigment particles on the support.

BEST MODE FOR CARRYING OUT THE INVENTION

The present invention is to be described more specifically.

[Dye]

The water soluble dye containing the single compound according to the invention is a dye having an absorption maximum at 440 to 540 nm with a half-value width of 90 nm to 200 nm in a visible region absorption spectrum in water and attaining broad absorption (for avoiding confusion, the dye is hereinafter referred to as "short wave dye S").

The term "single compound" in the specification of the present application means a compound which is not plural compounds having different properties. That is, in a case of measuring a visible region absorption spectrum in water, this means that the desired properties such as absorption maximum and half-value width are not shown by the combination of plural compounds but one compound shows such properties.

Since the short wave dye S has such absorption property, it can absorb lights over a wide range from blue color to green color which tend to be insufficient in the absorption spectrum of the disazo dye or trisazo dye and has favorable absorption property as the color compensation dye.

The absorption maximum of the short wave dye S is preferably between 450 and 520 nm and, particularly preferably, between 460 to 500 nm.

The half-value width of the short wave dye S is preferably between 100 nm and 180 nm, particularly preferably, between 110 nm and 160 nm.

Further, the short wave dye S according to the invention preferably has no dissociative phenolic hydroxyl group present in general dyes and such a structure can provide a favorable performance with less change of tone depending on the image forming material to be used and excellent in the gas resistance with less reactivity to oxidative gases such as ozone in air.

Further, the short wave dye S according to the invention preferably has 2 to 6 azo groups in one molecule and such structure can enhance the color forming property and can provide images of good fixing property since the plane of the dye extends largely.

Further, the number of the azo groups in one molecule is more preferably from 4 to 6 with the view point of color forming property and the fixing property.

The short wave dye S is not particularly limited so long as it has the property as defined in the present specification and can solve the subject described above, and can include polyazo dyes represented by the following general formula:

$(D)_n$-Y

In the general formula, D represents a dye residue comprising 3 to 4 aromatic rings having 20 or more π electrons in total and 2 to 3 azo groups conjugated to each other through those aromatic rings, n is 1 or 2 in which Y represents a hydrogen atom when n is 1 and Y represents a bivalent connection group when n is 2. The aromatic ring constituting the color forming group may either be a heterocyclic ring or hydrocarbon ring and is preferably a hydrocarbon ring. The number of π electrons on the aromatic ring means the number of π electrons as the entire condensed ring in a case where the aromatic ring constituting the color forming group is a condensed ring and, for example, a naphthalene ring has π electrons by the number of 10. The bivalent connection group represented by Y includes an alkylene group, arylene group, heterocyclic ring residue, —CO—, —SO$_n$— (n is 0, 1, or 2), —NR— (R represents hydrogen atom, alkyl group, aryl group), —O—, and a bivalent group formed by combining the connection groups and they may further have a substituent such as an alkyl group, aryl group, alkoxy group, amino group, acyl group, acylamino group, halogen atom, hydroxy group, carboxyl group, sulfamoyl group, carbamoyl group, sulfoneamide group, etc. Among them, preferred examples of the connection group include —NH—CO—NH—, —NH—CS—NH—, and the group of the following general formula.

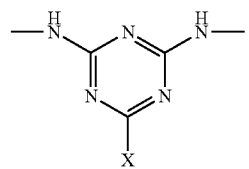

In the general formula, X represents a hydroxyl group, sulfo group, alkoxy group, aryloxy group, amino group (including alkylamino group, and arylamino group), or an alkyl group or arylsulfenyl group, and each group may further have a substituent.

For example, as the short wave dye S, commercially available C. I. Direct Red 84, brown 106, and brown 202 are useful and, among them, C. I. Direct Red 84 that can be used for tone control of various black dyes and is excellent also in the color forming property, fastness and fixing property is particularly useful.

Further, while examples of short wave dyes S used preferably in the invention are to be shown below as the structure of free acid, they may also be used in the form of any of salts thereof.

Preferred counter cation includes alkali metals (for example, lithium, sodium, potassium), ammonium, and organic cations (for example, pyridinium, tetramethyl ammonium, and guanidium).

| | A |
|---|---|
| | 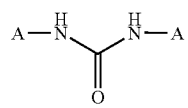 |
| 1 | 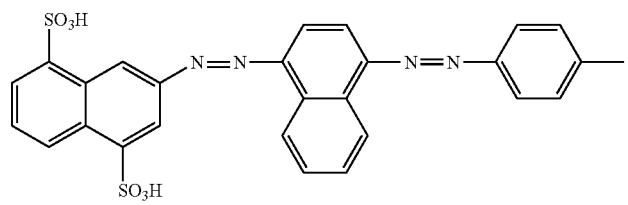 |
| 2 | 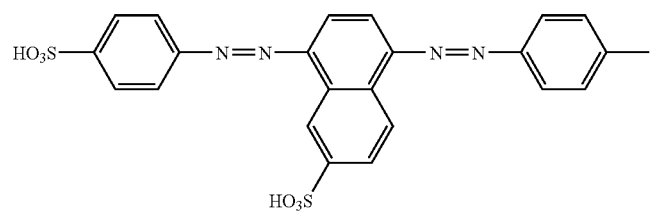 |
| 3 | 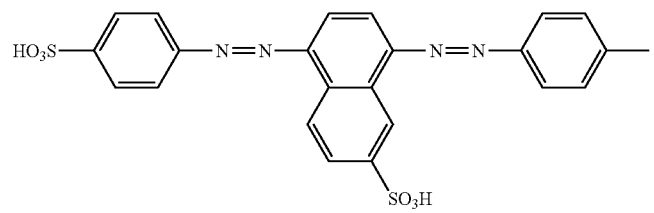 |
| 4 | 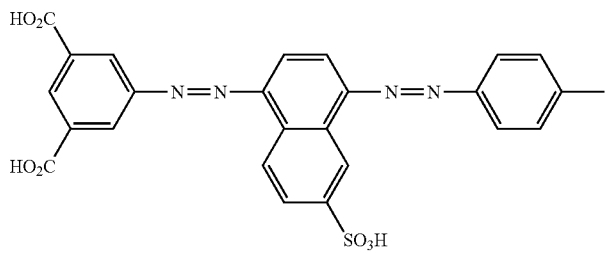 |
| 5 | 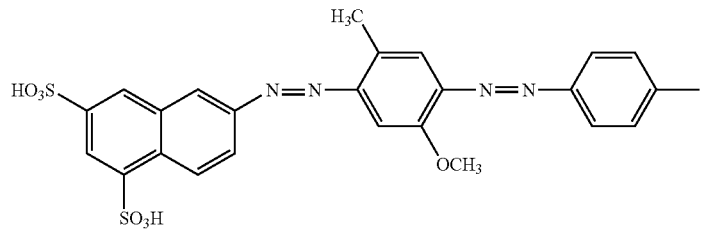 |
| 6 | 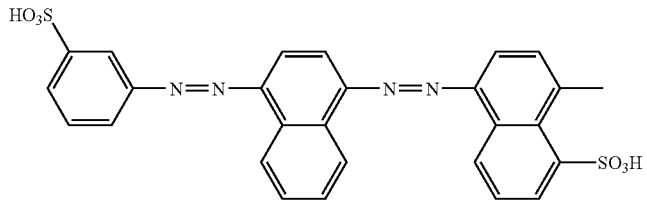 |

-continued

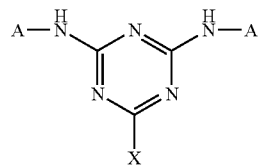

| | A | X |
|---|---|---|
| 7 | [naphthalene with two SO₃H groups]—N=N—[naphthalene]—N=N—[phenyl-CH₃] | —NHC₂H₄OH |
| 8 | HO₃S—[phenyl]—N=N—[naphthalene with SO₃H]—N=N—[phenyl-CH₃] | —NHC₂H₄OH |
| 9 | HO₃S—[phenyl]—N=N—[naphthalene with SO₃H]—N=N—[phenyl-CH₃] | —NHC₂H₄OH |
| 10 | HO₃S—[phenyl]—N=N—[naphthalene with SO₃H]—N=N—[phenyl-CH₃] | —N(C₂H₄OH) |
| 11 | HO₃S—[naphthalene with SO₃H]—N=N—[phenyl with H₃C and OCH₃]—N=N—[phenyl-CH₃] | —N(C₂H₄OH)₂ |
| 12 | HO₃S—[phenyl]—N=N—[naphthalene]—N=N—[naphthalene with CH₃ and SO₃H] | —NHC₂H₄OH |

-continued

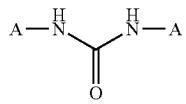

A

13

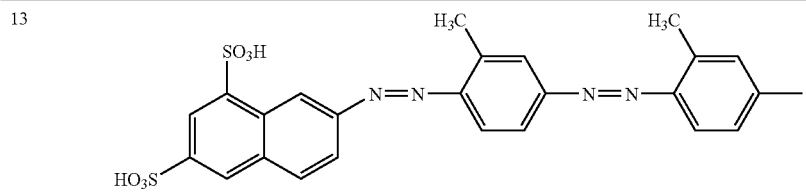

14

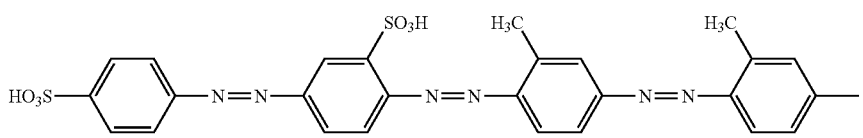

15

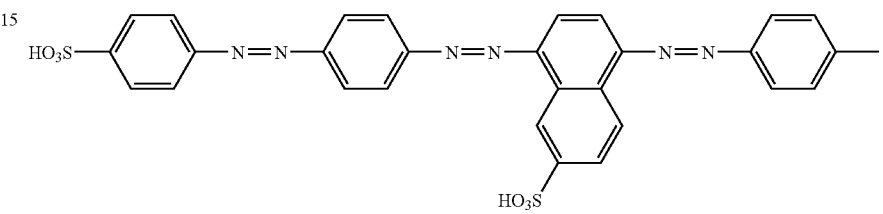

Among them, C. I. Direct Red 84 (Na salt of the compound example 2 described above) and Brown 106 (Na salt of the compound example 14 described above) are available as commercial dyes and preferred accordingly. Particularly, C. I. Direct Red 84 that can be used for the tone control of various black dyes and are excellent also in the color forming property, fastness and fixing property is particularly useful.

Also the short wave dyes S other than the commercial dyes can be synthesized easily from commercial raw materials in accordance with the synthesis route for C. I. Direct Red 84 or Brown 106 described in the color index vol. 4 (published from The Society of Dyers and Colorists)

The black ink composition of the invention contains the short wave dye in the ink by from 0.1 to 4 mass %, preferably, from 0.5 to 3.0 mass % and, particularly preferably from 1.0 to 2.5 mass %, which can be changed properly as desired.

The black ink composition of the invention preferably contains a water soluble black dye having azo groups conjugated to each other by the number of 2 to 4 in one molecule, preferably, a water soluble black dye having an absorption maximum wave length on the side longer than 550 nm (hereinafter referred to as "long wave dye L"). Further, preferred black tone can be obtained by using the long wave dye L in combination with the short wave dye S described above.

Further, it is preferred that the long wave dye L has a hydroxyl group at the conjugation position for the azo group or the number of the heterocyclic ring in the color forming group is one or less in order to ensure the high color forming property, the absorption characteristic with broad half-value width suitable to the black tone, and the ink stability, although the reason is not apparent.

Generally, since a dye having a hydroxyl group at the conjugation position for the azo group is sometimes poor in the fastness to light or active gases in air depending on the kind of image receiving materials and the storing conditions of printed maters, those having aggregate property and having a property capable of physically suppressing reaction are further preferred as the long wave dye L.

Whether a dye is in an aggregated state or not can be judged easily by measuring the visible absorption spectrum while changing the solvent species or dye concentrations, judging whether the dye has the aggregate property or not by inspecting the change of the absorption maximum wavelength, molar absorption coefficient and waveform and by comparison between the properties of the solution and the absorption spectrum of the dye on the image receiving material.

Specifically, it is preferred for such a dye for which a relation: $\epsilon 1/\epsilon 2 > 1.2$ is established between a molar absorption coefficient ($\epsilon 1$) at the maximum wave length of the visible region absorption measured for an aqueous solution of dye at 0.1 mmol/L using a cell of 1 cm optical channel length and a molar absorption coefficient ($\epsilon 2$) at the maximum wave length of the visible region absorption by measuring an aqueous solution of the dye at 0.2 mmol/L using a liquid crystal cell of 5 μm channel length as defined in Japanese Patent Application No. 2004-65569.

Among the long wave dyes L having the absorption maximum wavelength on the side longer than 550 nm used preferably in the invention, those having the following general formulae are particularly preferred.

While, the dyes are shown as the structure of free acids in the following general formulae, they may be also used in the form of any of salts thereof in actual use.

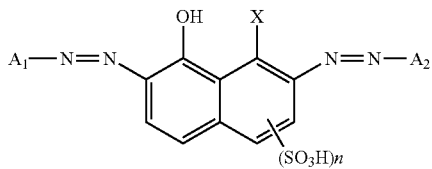

General formula 1

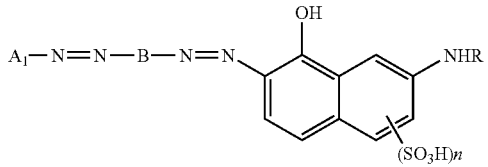

General formula 2

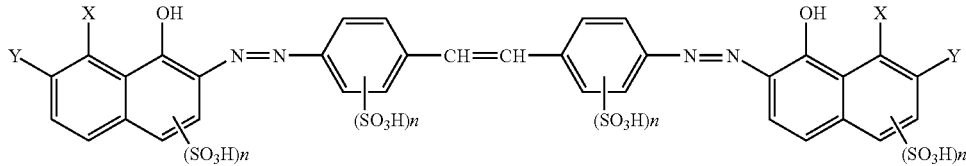

General formula 3

In the general formulae 1 to 3, in a case where substituents represented each by an identical symbol are present in plurality in one identical molecule, they may be identical or different with each other. X represents an amino group, hydroxyl group or hydrogen atom. Y represents a hydrogen atom or amino group. R represents a hydrogen atom, or an alkyl group, cycloalkyl group, aralkyl group, alkenyl group, aryl group, heterocyclic group, acyl group, or sulfonyl group which may have a substituent. The substituent which may be present includes, typically, a halogen atom, ionic hydrophilic group (sulfo group, carbamoyl group, etc), alkoxy group, hydroxy group, acylamino group, acyl group, carbamoyl group, sulfamoyl group, etc. n represents an integer of 0 to 3, and the sulfo group may substitute at any position on the benzene ring or naphthalene ring. $A_1$ and $A_2$ each represents a monovalent aromatic group of heterocyclic group. B represents a bivalent aromatic group or heterocyclic group. $A_1$ or $A_2$ may be further substituted with an azo group. $A_1$, $A_2$, or B may have a further substituent. The number of heterocyclic ring contained in the color forming group of the dye is preferably 1 or less. Further, a portion of the dye represented by the general formula may be dissociated to form a chelate dye in which a transition metal is coordinated.

In the general formulae described above, those dyes represented by the general formula 1 or general formula 2 are preferred and, the dyes of the general formula 1 are particularly preferred. In the dyes of the general formula 1, a dye in which X is the amino group or the hydroxyl group is preferred and the dye having the hydroxyl group is particularly preferred. Further, with a view point of the fastness, those in which an electron attractive group is substituted in the dye, or any one of $A_1$, $A_2$, B is a heterocyclic ring is preferred.

A preferred electron attractive group includes, for example, a nitro group, cyano group, halogen atom, sulfamoyl group, carbamoyl group, and ester group.

Examples of preferred heterocyclic rings include pyrazole, thiazole, isothiazole, oxazole, isooxazole, and pyridine, which may have a condensed ring.

Particularly preferred in the general formula 1 are compounds represented by the following general formula (4).

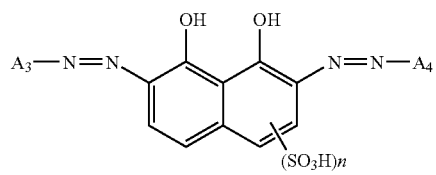

General formula 4

In the general formula 4, $A_3$ and $A_4$ each represents independently a heterocyclic ring group or an aryl group represented by the general formula 5. n represents an integer of 0 to 3.

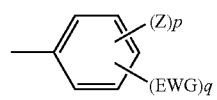

General formula 5

In the general formula 5, EWG (Electron Withdrawing Group) is an electron attracting group selected from the group consisting of a nitro group, cyano group, azo group, sulfamoyl group, carbamoyl group, and ester group, preferably, a nitro group or azo group. Z represents a substituent selected from an alkyl group, alkoxy group, sulfo group, carboxyl group, amino group, and acylamino group. The substituent represented by EWG, or Z may also has a further substituent. p represents an integer of 0 to 4. q represents an integer of 0 to 3, preferably, represents 1 or 2.

Further, while preferred examples of the long wave dyes L are to be shown below as the structure of free acids, they may also be used in the form of any of salts thereof.

Preferred counter cation includes alkali metals (for example, lithium, sodium, potassium), ammonium, and organic cations (for example, pyridinium, tetramethyl ammonium, and guanidium).

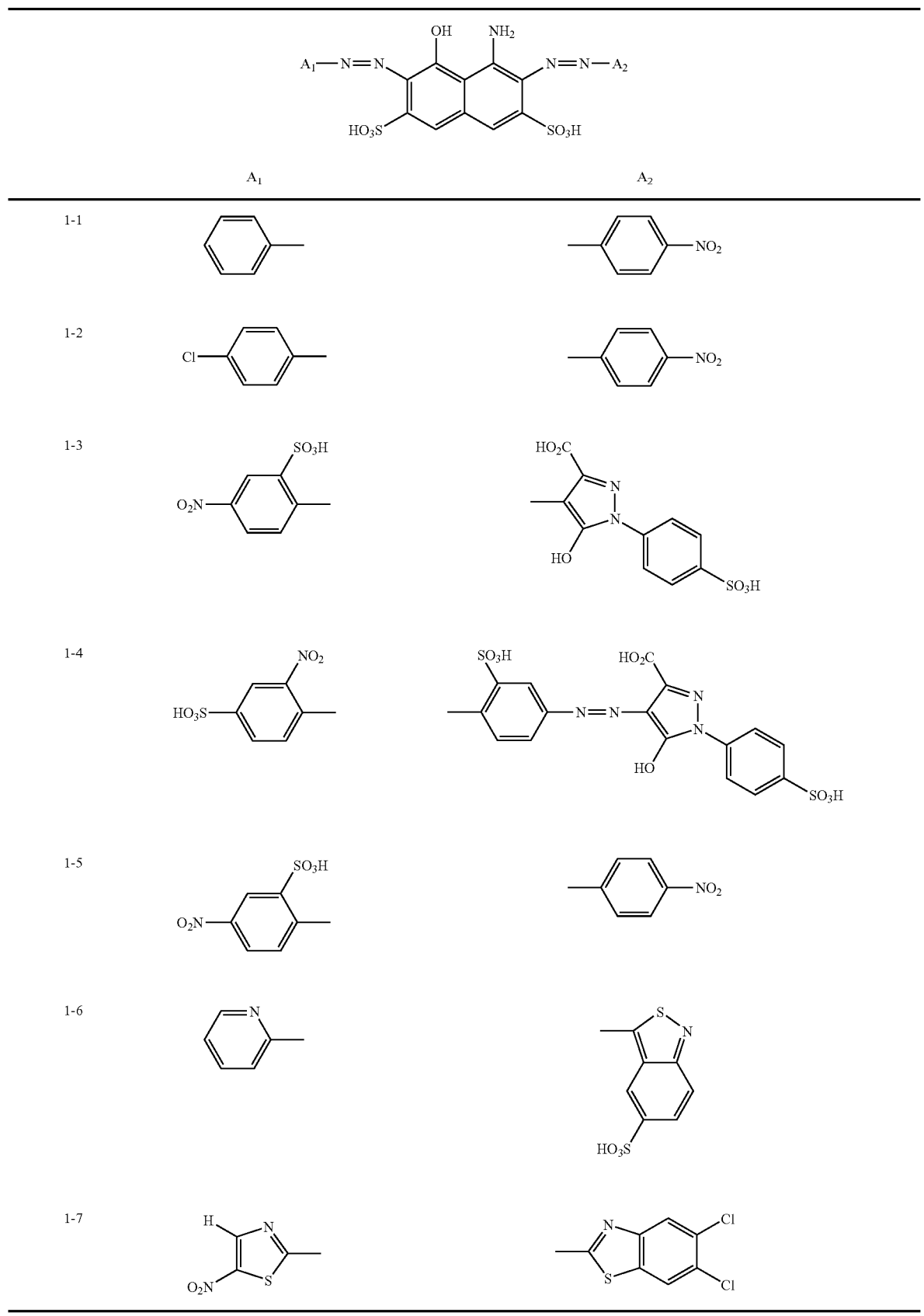

-continued
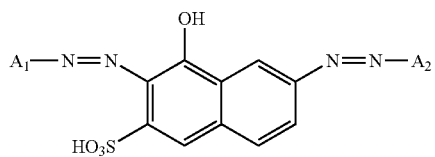
| | $A_1$ | $A_2$ |
|---|---|---|
| 1-8 | 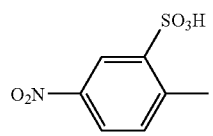 | 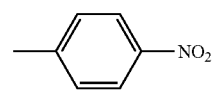 |
| 1-9 | 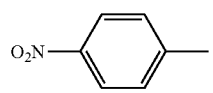 | 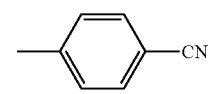 |
| 1-10 | 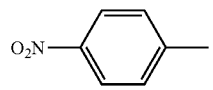 | 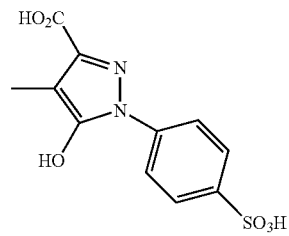 |
| 1-11 | 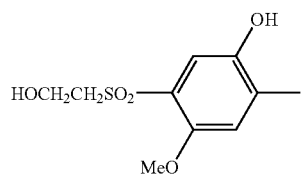 | 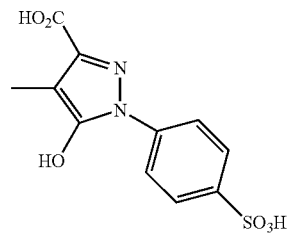 |
| 1-12 | 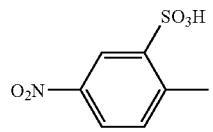 | 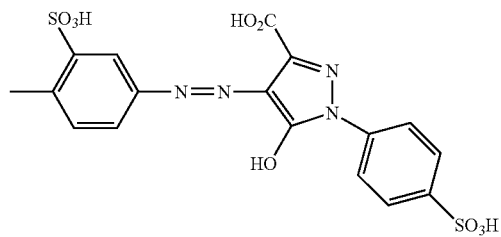 |
| 1-13 | 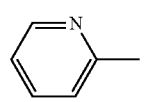 | 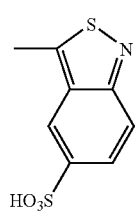 |

-continued
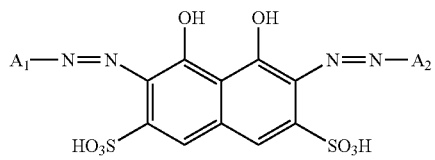
| | $A_1$ | $A_2$ |
|---|---|---|
| 1-14 | 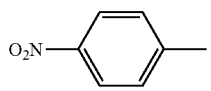 | 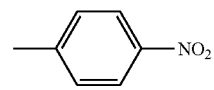 |
| 1-15 | 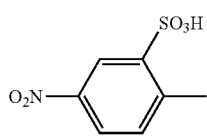 | 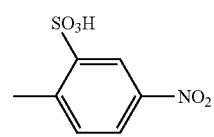 |
| 1-16 | 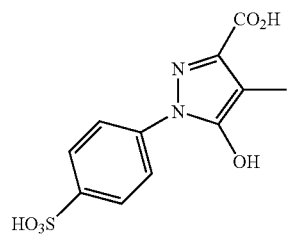 | 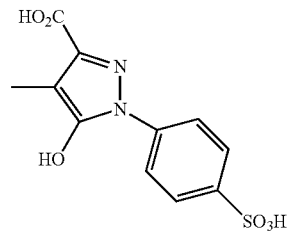 |
| 1-17 | 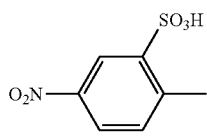 | 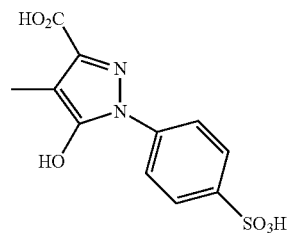 |
| 1-18 | 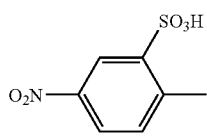 | 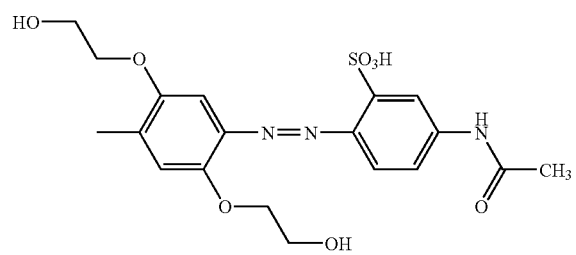 |
| 1-19 | 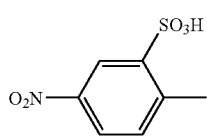 | 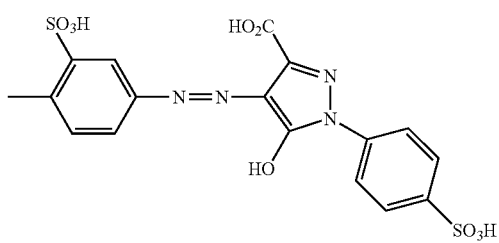 |

-continued
| | A | B | R |
|---|---|---|---|
| 2-1 | 3-(H₂O₃P)-phenyl | 2,5-di(OC₂H₅)-4-methyl-phenyl | H |
| 2-2 | 3-(H₂O₃P)-phenyl | 2-OC₂H₅-5-OCH₃-phenyl | H |
| 2-3 | 3-(HO₂C)-phenyl | 2,5-di(OC₂H₅)-phenyl | H |
| 2-4 | 3,5-di(HO₂C)-phenyl | 4,8-dimethyl-6-SO₃H-naphthyl | H |
| 2-5 | 3,5-di(HO₂C)-phenyl | 2,5-dimethyl-4-OC₂H₄OH-3-OC₂H₄OH-phenyl | H |
| 2-6 | 3-(HO₂C)-phenyl | 4,8-dimethyl-6-SO₃H-naphthyl | —CH₂CO₂H |
| 2-7 | 3-HO₃S-phenyl-N=N-(4-methyl-3-OCH₃)phenyl | 2,5-dimethyl-phenyl | 3-SO₃H-phenyl |
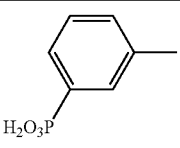

-continued
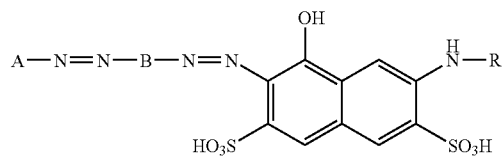
| | A | B | R |
|---|---|---|---|
| 2-8 | 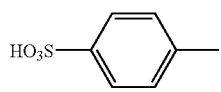 | 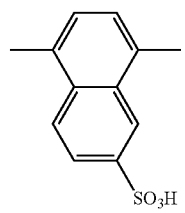 | H |
| 2-9 | 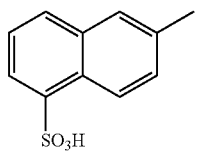 | 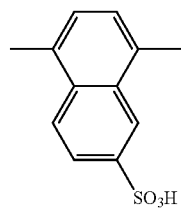 | H |
| 2-10 | 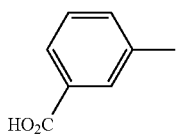 | 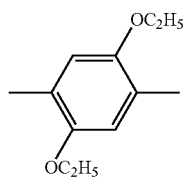 | H |
| 2-11 | 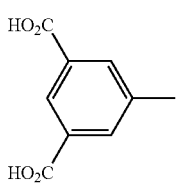 | 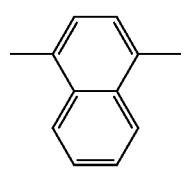 | H |
| 2-12 | 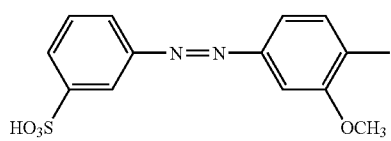 | 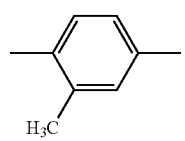 | 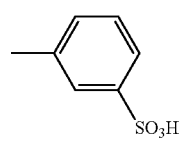 |
| 2-13 | 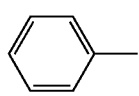 | 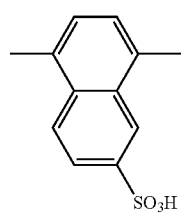 | —COCH$_3$ |

-continued
3-1
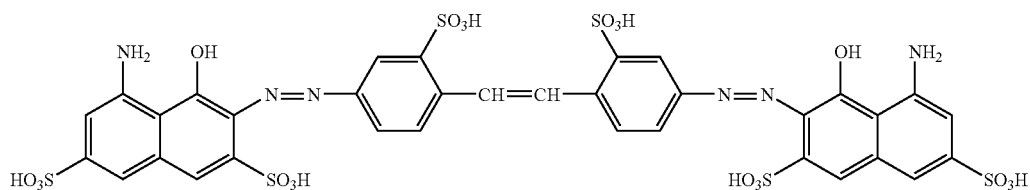
3-2
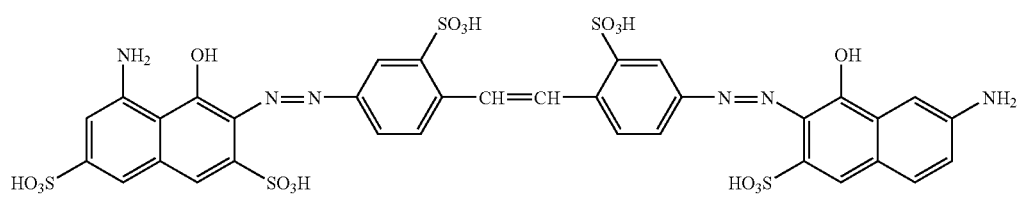
3-3
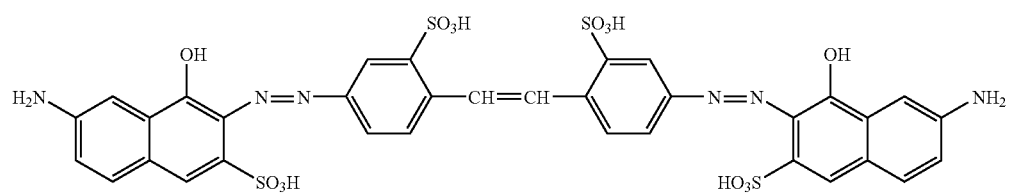
4-1
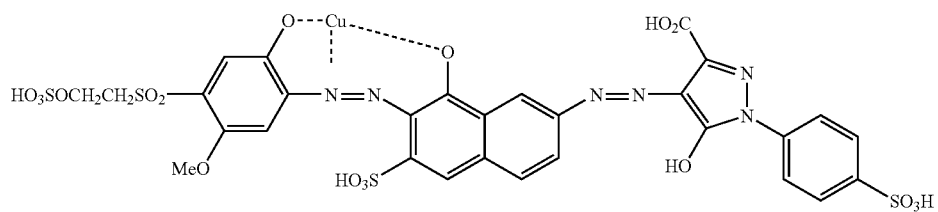
4-2
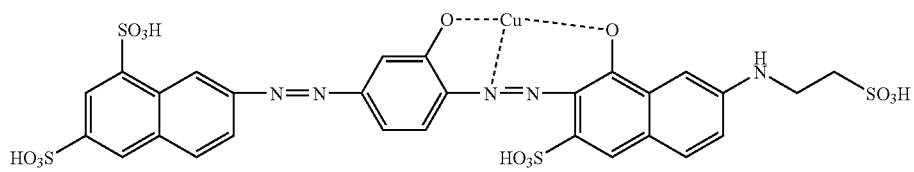

In addition to the dyes represented by the formulae described above, those dyes as described in each of the publications of JP-A Nos. 10-130557 9-255906, 7-97541, and 6-234944, EP No. 982371A1, JP-A Nos. 2002-302619, 2002-327131, and 2002-265809, JW-A Nos. 2000-43459, 2000-43451, 2000-43452, 2000-43453, 2003-106572, and 2003-104332 can also be used preferably as the long wave dye L.

The black ink composition of the invention contains, preferably, from 0.2 to 30 mass %, particularly preferably, from 0.5 to 15 mass % and, most preferably, from 1 to 10 mass % of the long wave dye L in the ink.

The ratio between the short wave dye S and the long wave dye L of the invention is preferably from 1 to 50 mass %, more preferably, 5 to 40 mass % and most preferably from 10 to 30 mass % of the short wave dye S relative to the long wave dye L.

[Ink]

The ink of the invention means an ink containing at least one kind of the water soluble dye of the invention. The ink of the invention can be incorporated with a medium and, in a case of using a solvent as a medium, it is particularly suitable as an ink for use in ink jet recording.

The ink of the invention can be prepared by using an oleophilic medium or an aqueous medium, as a medium, and dissolving and/or dispersing the dye of the invention therein. It is preferred to use the aqueous medium. As the aqueous medium, a mixture comprising water as a main ingredient and optionally adding a water miscible organic solvent can be used. As examples of the water miscible organic solvent, those described in JP-A No. 2003-306623 can be used. The water miscible organic solvents may be used by two or more kinds in combination. The ink of the invention also includes the ink composition excluding the medium.

The ink of the invention can contain other additives optionally within a range not deteriorating the effect of the invention. Other additives include, for example, known additives such as drying inhibitor (moistening agent), discoloration inhibitor, emulsion stabilizer, penetration promotor, UV-ray absorbent, corrosion inhibitor, anti-mold agent, pH controller, surface tension controller, defoamer, viscosity controller, dispersant, dispersion stabilizer, anti-rusting agent and chelating agent (refer to JP-A No. 2003-306623). Various kinds of additives described above are added directly to the ink liquid in a case of the water soluble ink.

The method of preparing the ink for use in ink jet recording is described specifically in each of the publications of JP-A Nos. 5-295312, 7-97541, and 7-82515, which can also be utilized for the preparation of the ink for use in ink jet recording of the invention in addition to the publications described in Background Art.

In the ink for ink jet according to the invention, other dyes may also be used in combination with the short wave dye S and the long wave dye L of the invention. In a case of using two or more kinds of dyes in combination, the total content of the dyes in 100 mass parts of the ink for use in ink jet recording is preferably 0.1 mass parts or more and 30 mass parts or less, more preferably, 0.2 mass parts or more and 20 mass parts or less and, further preferably, 0.5 to 15 mass parts.

The ink of the invention can be used not only for forming images of a single color but also for forming images of full color. In order to form full color images, an ink of magenta color, an ink of cyan color and an ink of yellow color can be used in addition to the ink of the invention and dense and pale two color inks can be used for each of the colors. Further, an ink of an intermediate color such as blue or orange can also be used.

As the dye that can be used as the ink for use in ink jet recording and for the ink of each color used in forming the images of full color, optional dyes can be used respectively and, for example, each of the dyes as described in column Nos. 0090 to 0092 of JP-A No. 2003-306623 can be utilized.

[Ink jet Recording Method]

In the ink jet recording method according to the invention, energy is supplied to the ink for use in ink jet recording and images are formed to known image receiving materials, that is, common paper, resin coated paper, exclusive ink jet paper as described, for example, in JP-A Nos. 8-169172, 8-27693, 2-276670, 7-276789, 9-823475, 62-238783, 10-153989, 10-217473, 10-235995, 10-337947, 10-217597, and 10-337947, film, paper used in common with electrophotography, cloth, glass, metal, ceramics, etc. As the image receiving material, an image receiving material having an ink receiving layer containing white organic pigment particles on a support is preferred. As the ink jet recording medium according to the invention, descriptions in column Nos. 0093 to 0105 of JP-A No. 2003-306623 can be applied.

Upon forming the images, a polymer latex compound may be used together with an aim of providing luster, water proofness or improving the weather proofness. The latex compound may be applied to the image receiving material at any timing, that is, before, after and simultaneously with the application of the colorant and, accordingly, it may be added in any place, that is, either in the image receiving paper or in the ink, or it may be used as a liquid consisting only of the polymer latex. Specifically, methods described in JP-A Nos. 2002-166638, 2002-121440, 2002-154201, 2002-144696, and 2002-080759, and Japanese Patent Application Nos. 2000-299465 and 2000-297365 can be used preferably.

A polymer latex may also be added to the constituent layer (including back coat layer) of the ink jet recording paper and the recording film. The polymer latex is used with an aim of improving the film property such as dimension stabilization, curl inhibition, adhesion inhibition and crack inhibition of film. The polymer latex is described in each of the publications of JP-A Nos. 62-245258, 62-136648, and 62-110066. When a polymer latex with low glass transition point (40° C. or lower) is added to a layer containing a mordant agent, cracking or curling of the layer can be prevented. Further, curling can be prevented also by adding a polymer latex of high glass transition point to the back coat layer.

For the ink of the invention, the ink jet recording system is not limited particularly and it can be used to known systems, for example, a charge control system of discharging an ink utilizing electrostatic attraction, a drop on demand system utilizing vibration pressure of a piezo-element (pressure pulse system), an acoustic ink jet system of converting electric signals into acoustic beams which are irradiated to the ink and discharging the ink by utilizing the irradiation pressure, and a thermal ink jet system of forming bubbles by heating the ink and utilizing the resultant pressure. The ink jet recording system includes a system of injecting a number of ink at low density with small volume referred to as a photo-ink, a system of improving the picture quality by using plural inks of different densities substantially at an identical hue, or a system of using colorless transparent ink.

EXAMPLE

The present invention is to be described by way of examples but the invention is not restricted to them.

Example 1

After adding super purified water (with resistance value of 18 MΩ or higher) to the following ingredients to make up to one liter and then stirred for one hour while heating at 30 to 40° C. Then, it was filtered under reduced pressure through a micro-filter with an average pore size of 0.25 μm to prepare a black ink liquid Bk-101 as a black ink composition.

[Black ink Bk-101 formulation]

(Solid content)

| | |
|---|---|
| Long wave dye L (Li salt of compound example 1-19 of long wave dye L) | 60 g/l |
| Short wave dye S (Na salt of compound example 2 of or short wave dye S: C.I. Direct Red 84) | 15 g/l |
| Proxel | 5 g/l |
| Urea | 20 g/l |
| Benzotriazole | 3 g/l |

(Liquid ingredient)

| | |
|---|---|
| Diethylene glycol monobutyl ether (DGB) | 100 g/l |
| Glycerine (GR) | 125 g/l |
| Diethylene glycol (DEG) | 100 g/l |
| 2-pyrrolidone | 100 g/l |
| Triethanolamine (TEA) | 30 g/l |
| Surfinol STG (Air Products Co.) (SW) | 10 g/l |

Ink liquids formed by changing the short wave dye S to the short wave dyes S (Na salt for each counter cation) and to the following comparative dyes were prepared respectively as shown in the following table.

TABLE 1

| | Long wave dye L | | Short wave dye S | | Short wave dye S | |
|---|---|---|---|---|---|---|
| | Dye species | g/l | Dye species | g/l | Dye species | g/l |
| Bk-101 (Invention) | Li salt for 1-19 | 60 | 2 | 15 | — | — |
| Bk-102 (Invention) | Li salt for 1-19 | 60 | 3 | 15 | — | — |
| Bk-103 (Invention) | Li salt for 1-19 | 60 | 4 | 15 | — | — |
| Bk-104 (Invention) | Li salt for 1-19 | 60 | 8 | 15 | — | — |
| Bk-105 (Invention) | Li salt for 1-19 | 60 | 10 | 15 | — | — |
| Bk-106 (Invention) | Li salt for 1-19 | 60 | 14 | 15 | — | — |
| Bk-107 (Comp. Example) | Li salt for 1-19 | 60 | A | 15 | — | — |
| Bk-108 (Comp. Example) | Li salt for 1-19 | 60 | B | 15 | — | — |
| Bk-109 (Comp. Example) | Li salt for 1-19 | 60 | A | 10 | B | 5 |
| Bk-110 (Comp. Example) | Li salt for 1-19 | 60 | C | 15 | — | — |

Absorption in water of Compound Example 2 for short wave dye S(C. I. Direct Red 84) used as color compensation dye: λmax=472 nm, half-value width=130 nm.

Other short wave dyes S of the invention also had λmax>460 nm and half-value width >110 nm or more which satisfied the conditions of the invention.

Structure of the dye for color compensation of comparative examples.

Comparative Dye A

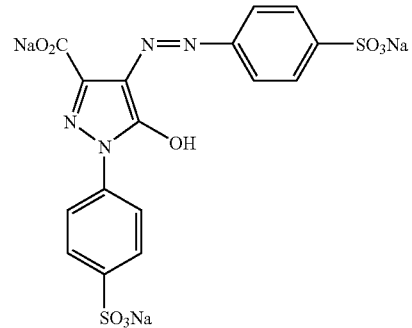

C.I. Acid Yellow 23
λmax=426 nm
half-value width=99 nm

Comparative dye B

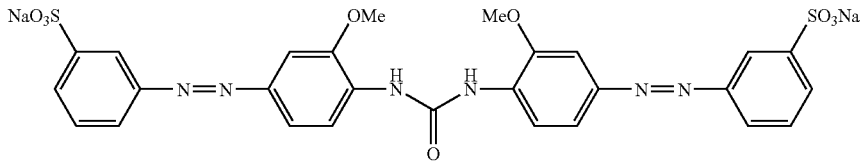

C.I. Direct Yellow 120
λmax=406 nm
half-value width=96 nm

Comparative Dye C (Synthesis Example 1 in JP-A No. 2002-332426)

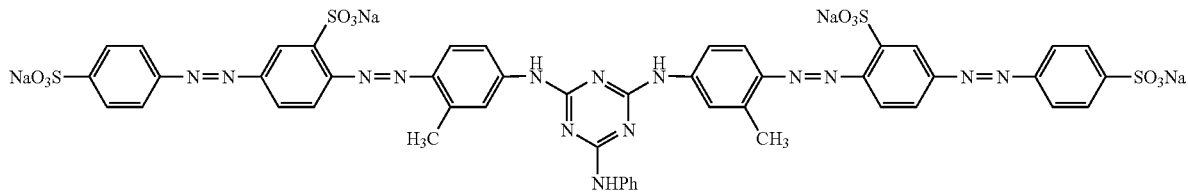

λmax=435 nm

The inks described above were charged in a black ink cartridge of an ink jet printer PM-980C manufactured by EPSON Co., and an image pattern and a character pattern with the gray density being changed stepwise were printed.

As the image receiving sheet, ink jet paper (Gasai) finished for photography manufactured by Fuji Photo Film Co. Ltd. was used.

1) In the evaluation for the hue, the gray tone at each printing density was judged visually for the stepwise patter of gray and evaluated as A for those showing a preferred gray tone at each density, as B for those in which the loss of gray balance was observed at some density, and as C for those in which loss of gray balance was lost at almost of density.

2) For the image storability of the black dye, the following evaluation was conducted by using a gray printing sample. The image storability was evaluated by measuring the density of the stepwise pattern using X-rite 310 density measuring equipment mounting a status A filter and measuring the change of the density at a point near $D_{vis}=1.0$ as the reference point.

2-1) For the light fastness, after measuring the density ($D_B$, $D_G$, $D_R$) Ci just after printing, a xenon light (85,000 lux) was irradiated for 10 days to images by using a weatherometer manufactured by Atlas Co. Then, evaluation was conducted by measuring the density Cf again and determining the dye residual ratio Cf/Ci×100.

It was evaluated as A in a case where the dye residual ratio was 80% or more for all $D_B$, $D_G$, and $D_R$, as B in a case where the ratio was 70 to 80% even for a portion, and as C in a case where the ratio was less than 70% even for a portion of them.

2-2) For the ozone resistance, the specimen was left in a box set to 10 ppm of an ozone gas concentration for 20 hours, and the density of the pattern S was measured and evaluated before and after leaving under the ozone gas by X-rite 310 to determine the residual ratio.

The ozone gas concentration in the box was set by using an ozone gas monitor manufactured by APPLICS (model: OZG-EM-01).

It was evaluated as A in a case where the dye residual ratio was 80% or more for all $D_B$, $D_G$, and $D_R$, as B in a case where the ratio was 70 to 80% even for a portion, and as C in a case where the ratio was less than 70% even for a portion.

3) For image blur under high humidity of the black ink was judged visually for the image blur by using a character printed sample after storage for 72 hours under the conditions at 25° C., 90% RH.

It was evaluated as A for those in which blur was not observed, as B for those in which hue of the color compensation dye was observed slightly at the periphery of the character, and as C in which the color compensation dye distinctly blurred in the vicinity of character.

The results are shown below.

TABLE 2

| Ink No. | Hue | Light fastness | Ozone resistance | Image blur |
|---|---|---|---|---|
| Bk-101 (Invention) | A | A | A | A |
| Bk-102 (Invention) | A | A | A | A |
| Bk-103 (Invention) | A | A | A | A |
| Bk-104 (Invention) | A | A | A | A |
| Bk-105 (Invention) | A | A | A | A |
| Bk-106 (Invention) | A | A | A | A |
| Bk-107 (Comp. Example) | C | C | C | C |
| Bk-108 (Comp. Example) | C | C | B | B |
| Bk-109 (Comp. Example) | C | C | C | C |
| Bk-110 (Comp. Example) | B | B | B | B |

From the results described above, it is apparent that the ink liquids of the invention are excellent with respect to the hue, fastness and image blur.

Example 2

Black ink liquids 201 to 210 were prepared in the same manner as in Example 1 except for changing the long wave dye L (Li salt for 1-19) used for the preparation of the black ink Bk-101 in Example 1 to the dyes shown in Table 3.

Table 4 shows the result of conducting the same evaluation as in the Example 1.

TABLE 3

| | Long wave dye L | | Short wave dye S | |
|---|---|---|---|---|
| | Dye species | g/l | Dye species | g/l |
| Bk-201 (Invention) | Li salt for 1-19 | 60 | Na salt for 2 | 15 |
| Bk-202 (Invention) | Li salt for 1-15 | 60 | Na salt for 2 | 15 |
| Bk-203 (Invention) | Li salt for 1-16 | 60 | Na salt for 2 | 15 |
| Bk-204 (Invention) | Li salt for 1-17 | 60 | Na salt for 2 | 15 |
| Bk-205 (Invention) | Li salt for 1-18 | 60 | Na salt for 2 | 15 |
| Bk-206 (Invention) | Li salt for 1-2 | 60 | Na salt for 2 | 15 |
| Bk-207 (Invention) | Li salt for 4-2 | 60 | Na salt for 2 | 15 |
| Bk-208 (Comp. Example) | Li salt for 1-18 | 60 | Comparative dye A | 15 |
| Bk-209 (Comp. Example) | Li salt for 1-18 | 60 | Comparative dye B | 15 |
| Bk-210 (Comp. Example) | Li salt for 1-18 | 60 | Comparative dye C | 15 |

TABLE 4

| Ink No. | Hue | Light fastness | Ozone resistance | Image blur |
|---|---|---|---|---|
| Bk-201 (Invention) | A | A | A | A |
| Bk-202 (Invention) | A | A | A | B |
| Bk-203 (Invention) | A | B | B | A |
| Bk-204 (Invention) | A | B | A | A |
| Bk-205 (Invention) | A | A | A | A |
| Bk-206 (Invention) | A | A | A | B |
| Bk-207 (Invention) | A | A | B | A |
| Bk-208 (Comp. Example) | C | C | B | B |
| Bk-209 (Comp. Example) | C | C | C | C |
| Bk-210 (Comp. Example) | B | B | B | B |

As shown in the tables described above, the ink liquids of the invention were excellent in view of the hue, fastness, and image blur.

Example 3

After adding super purified water with the resistance value of 18 MΩ or higher to the following ingredients to make up to one liter, they were stirred for one hour while heating at 30 to 40° C. Then, it was filtered under a reduced pressure through a micro-filter with an average pore size of 0.25 μm to prepare a black ink liquid Bk-301. Bk-302 to 310 were prepared by changing the short wave dyes as in Table 5.

[Black ink Bk-301 formulation]

(Solid content)

| | |
|---|---|
| Long wave dye L (Na salt of Compound Example 1-19) | 60 g/l |
| Short wave dye S (Na salt of compound Example 2 of short wave dye S: C.I. Direct Red 84) | 15 g/l |
| Proxel | 5 g/l |
| Urea | 20 g/l |
| Benzotriazole | 3 g/l |

(Liquid ingredient)

| | |
|---|---|
| Trithylene glycol (TEG) | 80 g/l |
| Glycerine (GR) | 120 g/l |
| Triethylene glycol monobutyl ether(TGB) | 70 g/l |
| 1,5-pentanediol (PTD) | 60 g/l |
| Isopropanol (IPA) | 20 g/l |
| Triethanolamine (TEA) | 8 g/l |
| Surfinol STG (Air Products Co.) (SW) | 10 g/l |

Ink liquids changing only for the short wave dye S to the dye species in the following table were prepared respectively in the black ink liquid.

TABLE 5

| | Long wave dye L | | Short wave dye S | | Short wave dye S | |
|---|---|---|---|---|---|---|
| | Dye species | g/l | Dye species | g/l | Dye species | g/l |
| Bk-301 (Invention) | Na salt for 1-19 | 60 | 2 | 15 | — | — |
| Bk-302 (Invention) | Na salt for 1-19 | 60 | 3 | 15 | — | — |
| Bk-303 (Invention) | Na salt for 1-19 | 60 | 4 | 15 | — | — |
| Bk-304 (Invention) | Na salt for 1-19 | 60 | 8 | 15 | — | — |
| Bk-305 (Invention) | Na salt for 1-19 | 60 | 10 | 15 | — | — |
| Bk-306 (Invention) | Na salt for 1-19 | 60 | 14 | 15 | — | — |
| Bk-307 (Comp. Example) | Na salt for 1-19 | 60 | A | 15 | — | — |
| Bk-308 (Comp. Example) | Na salt for 1-19 | 60 | B | 15 | | |
| Bk-309 (Comp. Example) | Na salt for 1-19 | 60 | A | 10 | B | 5 |
| Bk-310 (Comp. Example) | Na salt for 1-19 | 60 | C | 15 | — | — |

The inks described above were charged in a black ink cartridge of an ink jet printer PIXUS990i manufactured by CANON Co., and an image pattern and a character pattern with the density being changed stepwise were printed.

As the image receiving sheet ink jet paper (Gasai) finished photography, manufactured by Fuji Photo Film Co. Ltd. was used.

Evaluation for the image fastness was conducted in the same manner as in Example 1.

The results are shown below.

TABLE 6

| Ink No. | Hue | Light fastness | Ozone resistance | High humidity blur |
|---|---|---|---|---|
| Bk-301 (Invention) | A | A | A | A |
| Bk-302 (Invention) | A | A | A | A |
| Bk-303 (Invention) | A | A | A | A |
| Bk-304 (Invention) | A | A | A | A |
| Bk-305 (Invention) | A | A | A | A |
| Bk-306 (Invention) | A | A | A | A |
| Bk-307 (Comp. Example) | C | C | C | C |
| Bk-308 (Comp. Example) | C | C | B | B |
| Bk-309 (Comp. Example) | C | C | C | C |
| Bk-310 (Comp. Example) | B | B | B | B |

From the results described above, it is apparent that the ink liquids of the invention are excellent for the hue, fastness and image blur.

INDUSTRIAL APPLICABILITY

According to the ink for use in ink jet recording and an ink jet recording method using the black ink composition according to the invention, images having favorable black tone, showing high printing density, and having high fastness to light and active gases in circumstance can be formed, and blur of images during storage under high humidity can also be improved remarkably.

The invention claimed is:

1. A black ink composition comprising
a water soluble dye containing a single compound showing an absorption maximum at 440 to 540 nm with a half-value width of 90 nm to 200 nm for a visible region absorption spectrum in water, wherein the single compound has from 4 to 6 azo groups in one molecule.

2. A black ink composition according to claim 1, wherein the single compound is used as the color compensation dye.

3. A black ink composition according to claim 1, wherein the single compound does not have a phenolic hydroxyl group.

4. A black ink composition according to claim 1, wherein the water soluble dye is contained by 0.1 to 4 mass % in black ink composition.

5. A black ink composition according to claim 1, further comprising
a water soluble black dye having from 2 to 4 azo groups conjugated to each other in one molecule.

6. A black ink composition according to claim 5, wherein the water soluble black dye has a hydroxyl group at a conjugation position of at least one of the azo groups.

7. A black ink composition according to claim 5, wherein the water soluble black dye has one or less heterocyclic ring in a color forming group.

8. A black ink composition according to claim 5, wherein the water soluble black dye has an aggregate property.

9. An ink jet recording method comprising
forming an image on an image receiving material by utilizing an ink comprising the black ink composition according to claim 1,
wherein the image receiving material comprises: a support; and an ink receiving layer containing white inorganic pigment particles on the support.

* * * * *